April 7, 1970

S. E. SCISSON 3,504,506

METHOD AND APPARATUS FOR STORING ANHYDROUS
AMMONIA IN UNDERGROUND CAVERNS

Filed Aug. 7, 1967

INVENTOR.
S. E. SCISSON

BY Head & Johnson

ATTORNEYS

United States Patent Office 3,504,506
Patented Apr. 7, 1970

3,504,506
METHOD AND APPARATUS FOR STORING ANHYDROUS AMMONIA IN UNDERGROUND CAVERNS
Sidney E. Scisson, Tulsa, Okla., assignor to Fenix & Scisson, Inc., Tulsa, Okla., a corporation of Oklahoma
Filed Aug. 7, 1967, Ser. No. 658,914
Int. Cl. F17c 5/00
U.S. Cl. 62—45          7 Claims

ABSTRACT OF THE DISCLOSURE

The miscibility of foreign fluids with chemicals, such as anhydrous ammonia, in underground storage caverns is controlled by removing the foreign fluid and/or its reaction product at a time when its density condition is favorable for separation and removal from the cavern. Further separation at the surface is optional depending upon the marketability of the formed solution and/or the components thereof.

BACKGROUND OF THE INVENTION

Volatile products such as liquefied petroleum gases (butane, propane, etc.) have been successfully stored in underground caverns such as mined storage caverns or cavities dissolved in salt. However, certain chemicals such as anhydrous ammonia have not been successfully stored in underground cavities because of the chemical reaction of ammonia with salt or in the case of a mined storage cavern, with water inflow typically found in many of such caverns.

Ammonia is manufactured on a continuous year round basis yet is subject to a principal market activity, primarily for agricultural purposes from 30 to 60 days of a calendar year. The primary method of storage presently used is in insulated and refrigerated steel storage tanks. Such method, while satisfactory, requires however that the ammonia be refrigerated to $-28°$ F. so that the ammonia may be stored at substantially atmospheric pressure. In order to store ammonia in this manner it must either be refrigerated before transporting it to the storage facility or there must be sufficient refrigerating apparatus at the storage site to cool the ammonia before it is placed in the storage tanks. The refrigeration aspect causes a restriction on the rate of handling ammonia and has been a drawback in the development of high volume low cost transportation such as is possible with a pipeline system.

SUMMARY

Generally speaking, this invention overcomes the problems heretofore existing in the transportation and storage of chemicals, such as anhydrous amomnia ($NH_3$).

A further object of this invention is to provide a method and apparatus for storing chemicals, such as anhydrous ammonia, in mined underground storage caverns in which foreign fluids tending to normally react with the chemical are controlled to prevent contamination of the stored chemical.

More particularly, this invention provides a method and apparatus for storing anhydrous ammonia either in a vapor or a liquid phase in mined underground storage caverns. The underground cavern is constructed in rocks that are inert to the ammonia and any water inflow, which reacts chemically to form ammonia hydroxide ($NH_4OH$), is handled and controlled.

Underground cavern water control methods typically utilize pressure grouting with various cementitous-like materials which are not reactive with the ammonia. However, areas having substantial water influx into the cavern that can not be completely sealed by normal methods are controlled in this invention by confining the area with a barrier such as steel plate which is sealed about the water influx area and from which water and/or aqua ammonia is piped, controlled, and collected at a common basin usually at a lowermost point in the cavern. Surface controlled pumps are utilized to remove the unwanted fluids.

In dealing specifically with anhydrous ammonia, water reacts to form ammonium hydroxide or aqua ammonia. With the reaction there is a density change for a short period of time followed by a molecular interaction wherein the aqua ammonia will disperse and be lost in the bulk of the anhydrous ammonia, diluting same beyond marketable or critical limits. This invention, first provides the causation of the water-$NH_3$ reaction to preferably occur in a confined collection system, wherefrom the resulting aqua ammonia product is removed prior to its disbursement from the collection area. Surface provision is made to process or separate the reaction product or sell or store same according to the market needs.

DESCRIPTION OF THE PREFERRED EMBODIMENTS

Figure 1:
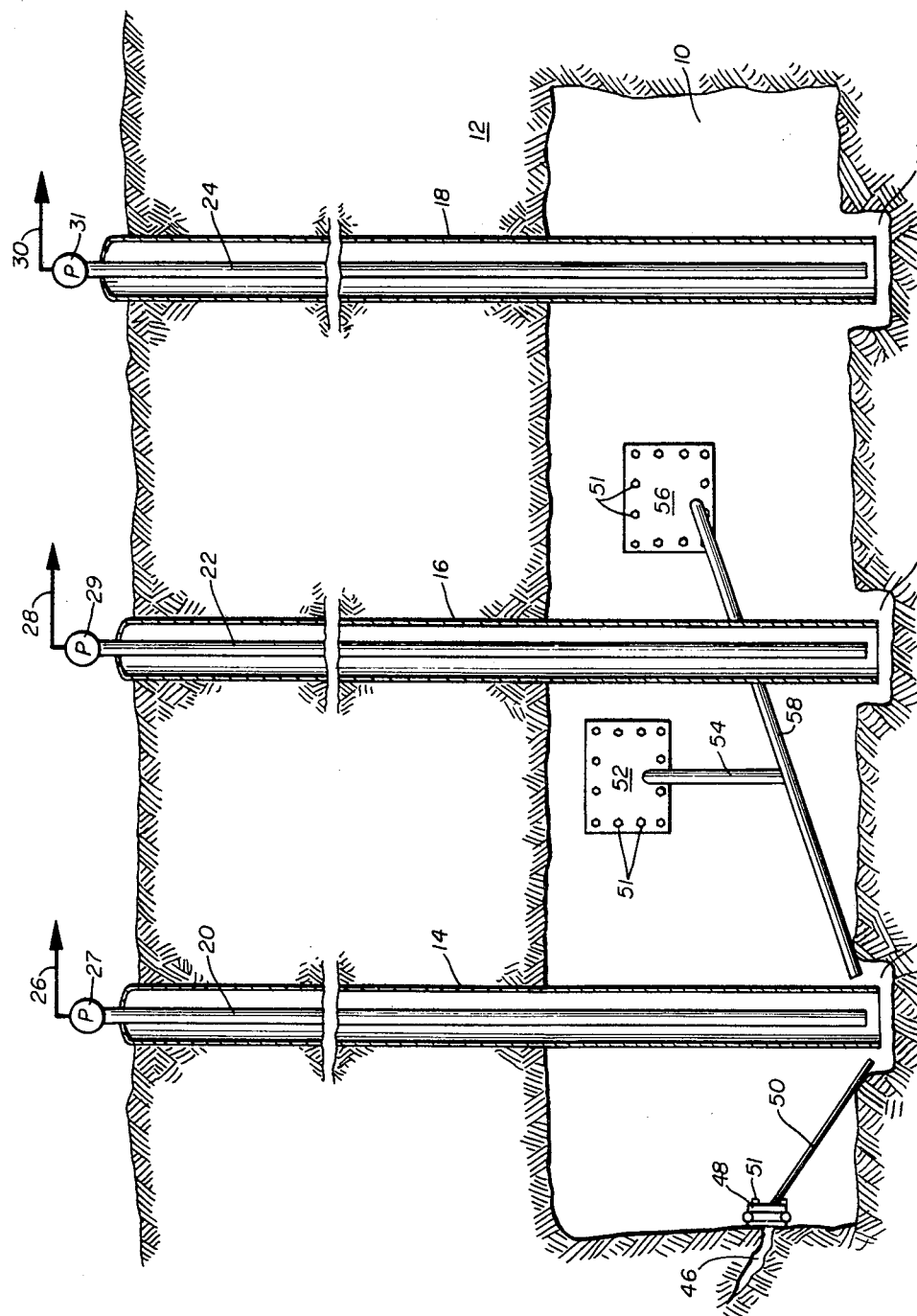
FIGURE 1 is a sectional view of an underground storage cavern typical of use for this invention.

Referring now to FIGURE 1 cavern 10 is formed in the underground surface 12 preferably by mining processes known in the art. The underground formations however shall be inert to the proposed chemical to be stored. One or a plurality of well casings 14, 16 and 18 provide communication between the pump sumps in the cavern and the surface of the ground. Surface controlled pumps for removing the stored material in underground cavern 10 are pumps 20, 22 and 24 positioned within the respective well casings 14, 16 and 18. Outlet or supply conduits 26, 28 and 30 are respectively connected to the pumps 20, 22 and 24.

Although not shown, suitable inlet conduits can be installed to supply chemical to the cavern by way of the annulus space in the well.

The tubing members 14, 16 and 18 are preferably caused to extend substantially across the vertical length of the cavern 10 into preformed collecting sumps or basins 40, 42 and 44 which are at the lowermost extent of cavern 10. In those instances where fractures such as at 46 exist within the cavern walls they tend to permit foreign fluids, such as water, to normally enter the cavern and possibly contaminate the stored fluid. The fracture is covered and confined by utilizing, for example, steel plates 48, 52 and 56 which can be bolted to the cavern walls to provide a seal. It is understood, however, that other metal or synthetic resin materials, non-corrodible and inert to stored and foreign fluids, may be utilized. Conduits such as at 50, 54 and 58 extend from each confining areas of the cavern into a common collecting basin such as at 40. Although one collecting basin is shown in this embodiment, it is understood that more than one may be utilized depending on the conditions existing in the cavern.

Figure 2:
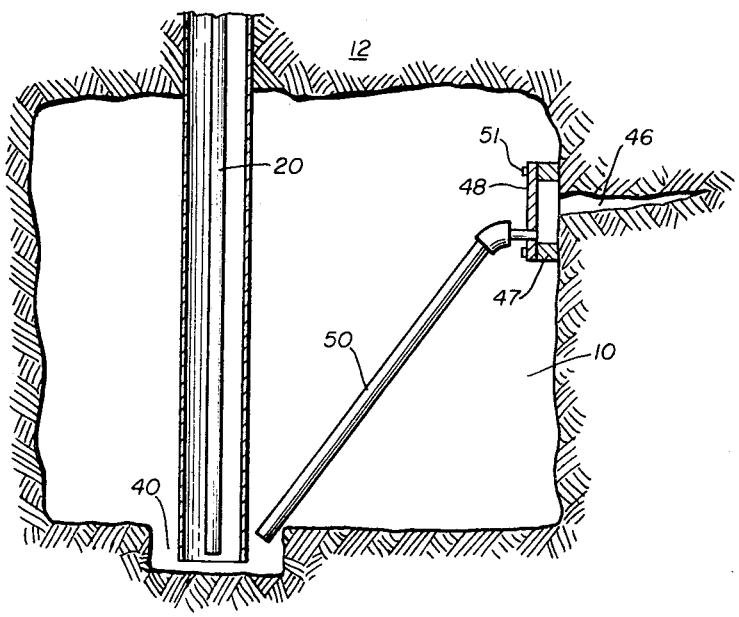
FIGURE 2 is an enlarged sectional view of a lower portion of an underground cavern providing means for confining and controlling an influx of foreign fluids into the cavern.

FIGURE 2 is an enlarged segmented view of cavern 10 in subsurface formation 12 schematically depicting a typical embodiment for collecting foreign fluids such as water which might contaminate the chemical to be stored within the cavern such as anhydrous ammonia. As shown therein fracture 46 is caused to be confined by a plate 48 which is held to seal members 47 by bolts 51, the seal members being performed or otherwise retained to the cavern wall.

Figure 3:
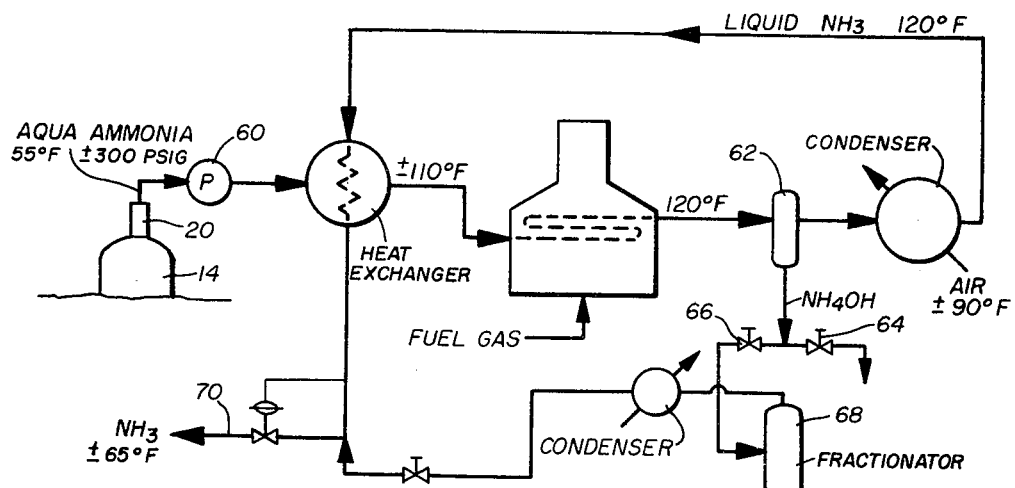
FIGURE 3 is a process schematic depicting one manner of removing foreign reactants or fluids from an underground cavern of this invention.

Since the water inflow to a cavern filled with anhydrous ammonia, for example, will generally maintain a measurable condition, it will be possible to determine the amount of aqua ammonia or ammonium hydroxide ($NH_4OH$) that will be formed for a given time. Since, it may be determined, upon removal of the aqua ammonia whether it will be more economical to market the aqua ammonia itself or to remove the water by fractionation refluxing the ammonia to storage or to the distribution system, a process plant, as schematically shown in FIGURE 3, may be utilized for one or all of the outlets from the storage cavern. For instance it has been found that when water, mixing with anhydrous ammonia, forms ammonium hydroxide there is an increment of time that it is denser than the stored anhydrous ammonia causing same to be easily collectable within the collecting basin areas of the cavern for removal. If not collected, after the period of time the aqua ammonia will then disperse or spread throughout the remaining anhydrous ammonia. Hence one of the basic purposes of this invention is to provide methods and apparatus and process treatment which will prevent this subsequent dispersal and contamination of the anhydrous ammonia stored in the cavern. Typically the aqua ammonia is removed from the well through tubing 20 by a pump 60 wherein it is caused to be heat exchanged with liquid ammonia at 120° F. raising the temperature from around 55° F. as found in the cavern to around 110° F. The aqua ammonia stream is then heated to approximately 120° F. where the aqua ammonia solution is separated from the ammonia in vessel 62 concentrating the aqua ammonia to around a 30% ammonia solution, a marketable product, which can be removed by opening valve 64 while maintaining valve 66 closed. However, if there is no market for the aqua ammonia the water can then be removed by closing valve 64 and opening valve 66 and passing same through a fractionator 68 removing the water therefrom and sending ammonia to outlet conduit 70. The ammonia coming off the fractionator will be a vapor form and will need to be condensed.

This invention has been described with reference to specific and preferred embodiments. It will be apparent, however, that other modifications can be made without departing from the spirit and scope of the invention. Accordingly, this invention should be construed not to be limited to the embodiment herein described but should be limited only by the scope of the appended claims.

What is claimed is:

1. A method of storing a chemical in underground caverns constructed in formations normally inert to said chemical, comprising:

visually locating within said cavern any areas of foreign fluid flow which would tend to dilute or react with said chemical;

confining the flow of said fluid from said areas;

controlling the flow by collecting said fluid or the reaction product of said fluid and chemical at one or more common places in said cavern; and removing and fluid or reaction product from said cavern.

2. A method according to claim 1 wherein said removed fluid is processed to separate said diluent or reactant.

3. A method according to claim 2 wherein said separated chemical is returned to said cavern.

4. A storage area for anhydrous ammonia under a temperature of about 55° F. and about 300 p.s.i.g. comprising:

an underground cavern formed in a rock formation inert to said ammonia, said rock formation having a water input area leading into said cavern;

a collecting basin formed within the cavern of said formation in the bottom thereof;

a closable well extending from the surface of the ground into said cavern;

a well extending from said surface into said collecting basin;

means to confine the flow of said water input from said area to said collecting basin; and means to remove water and/or the reaction product of said water and said ammonia from said basin through said well.

5. A storage area according to claim 4 wherein said means to confine includes sealed removable closures about said water input area.

6. A storage area according to claim 4 wherein said removed water and/or reaction product is subjected to separation of said water and ammonia.

7. A storage area according to claim 6 wherein said ammonia is returned to said cavern for storage.

References Cited

UNITED STATES PATENTS

| 2,880,593 | 4/1959 | Johnson et al. | 62—55 |
| 2,901,403 | 8/1959 | Adams et al. | 62—48 |
| 2,932,170 | 4/1960 | Patterson et al. | 62—260 |
| 2,947,146 | 8/1960 | Loofbourow | 61—.5 |
| 2,947,147 | 8/1960 | Johnson | 61—.5 |
| 3,089,309 | 5/1963 | Closs et al. | 61—.5 |

LLOYD L. KING, Primary Examiner

U.S. Cl. X.R.

62—240